United States Patent [19]

Kishima et al.

[11] Patent Number: 5,790,898

[45] Date of Patent: Aug. 4, 1998

[54] INFORMATION PROCESSING APPARATUS USING FINITE STATE MACHINE

[75] Inventors: Shuzo Kishima, Kanagawa; Kiyoshi Ito, Matsudo, both of Japan

[73] Assignee: Yamatake-Honeywell Co., Ltd., Tokyo, Japan

[21] Appl. No.: 828,834

[22] Filed: Mar. 24, 1997

Related U.S. Application Data

[63] Continuation of Ser. No. 608,965, Feb. 29, 1996, abandoned, which is a continuation of Ser. No. 121,591, Sep. 14, 1993, abandoned.

[30] Foreign Application Priority Data

Sep. 14, 1992 [JP] Japan .................................... 4-269130

[51] Int. Cl.⁶ ............................................ G06F 9/00
[52] U.S. Cl. ........................................ 395/899; 395/903
[58] Field of Search ................................. 395/899, 903

[56] References Cited

U.S. PATENT DOCUMENTS

| | | | |
|---|---|---|---|
| 4,300,199 | 11/1981 | Yoknis | 364/557 |
| 4,663,725 | 5/1987 | Truckenbrod | 364/505 |
| 5,038,307 | 8/1991 | Krishnakumar | 364/578 |
| 5,165,595 | 11/1992 | Horio | 236/49.3 |
| 5,201,186 | 4/1993 | Hanson | 62/126 |
| 5,270,952 | 12/1993 | Adams | 364/505 |
| 5,295,364 | 3/1994 | Truckenbrod | 62/209 |
| 5,369,597 | 11/1994 | Bujak | 364/505 |

OTHER PUBLICATIONS

"Statecharts: A Visual Formalism for Complex Systems", David Harel, Science of Computer Programming 8, pp. 231–274 (1987).

"Statemate: A Working Environment for the Development of Complex Reactive Systems", David Harel et al., IEEE Transactions on Software Engineering, vol. 16, No. 4, pp. 403–413, Apr. 1990.

*Primary Examiner*—Eric Coleman
*Attorney, Agent, or Firm*—Lane, Aitken & McCann

[57] ABSTRACT

An information processing apparatus uses a triad-based state transition model which is implemented in a state machine for making rational determinations on the state of a system of interest and for controlling the same to an appropriate state. The triad-based state transition model is stored in a memory unit of the apparatus and made up of a first group of states for defining natural behavior of the system to be controlled irrespective of forced actions; a second group of states for defining forced actions for directing the behavior of the system to be controlled to a target; and a third group of state for defining target states to which the system to be controlled may proceed from the first group of states as a result of determining natural behavior of the system based on a first predetermined threshold value, and as a result of determining a change in the system behavior due to a forced action based on a second predetermined threshold value. The information processing apparatus has an interpreter unit for interpreting the state of the finite state transition machine for processing information on the system to be controlled and for controlling the system to be controlled based on a current state of the system to be controlled represented in the finite state transition machine.

2 Claims, 4 Drawing Sheets

INFORMATION PROCESSING APPARATUS USING FINITE STATE MACHINE

This application is a continuation of application Ser. No. 08/608,965, filed Feb. 29, 1996 now abandoned, which is a continuation of application Ser. No. 08/121,591, filed Sep. 14, 1993 now abandoned.

BACKGROUND OF THE INVENTION

1. Field of the Invention

The present invention generally relates to an information processing apparatus, and more particularly to an information processing apparatus which utilizes, as a system architecture, a finite state machine for implementing a state transition model.

2. Description of the Prior Art

Information processing systems which have a system architecture based on a finite state transition machine, for implementing a state transition model (hereinafter simply referred to as "information processing apparatus using a state transition model") are advantageous in that programming is not substantially necessary, over ordinary information processing apparatuses which utilize a computer adapted to execute programs written in any computer language such as C. For this reason, the information processing apparatus using a state transition model is drawing much attention as an information processing technique of the next generation. Such information processing systems using a state transition model are described, for example, in an article entitled "STATECHARTS: A VISUAL FORMALISM FOR COMPLEX SYSTEMS" by David Harel, Science of Computer Programming 8, pp231–274 (1987), and an article entitled "STATEMATE: A Working Environment for the Development of Complex Reactive Systems" by David Harel et al, IEEE Transactions on Software Engineering, Vol. 16, No. 4, pp403–413, April, 1990. The above-mentioned STATECHARTS, for example, regards a system in a computer that consists of a functional module (in the form of software) that reacts to events from the external world.

Stated another way, a reactive system design is considered to be a design of event processing software. This concept assumes that the behavior of the external world is given before starting the design of reactive system software and ignores the reasons causing such external events to occur. That is, it is only necessary to consider the behaviors or events to be expected but not the natural dynamics of the external world causing those behaviors or events. STATECHARTS provides a hierarchical design method using the Hierarchical State Transition Diagram (STD) and step-by-step software break-down procedure for the reactive system software that reacts to external events.

A conventional information processing apparatus using a state transition model will be explained in connection with an air conditioning control plant with reference to FIGS. 1 and 2. In this example, the air conditioning control plant is assumed to be controlled by a state transition model provided in the information processing apparatus. It should be noted that the air conditioning control apparatus is a only exemplary, and the state transition model may be used in many other applications.

Figure 1:
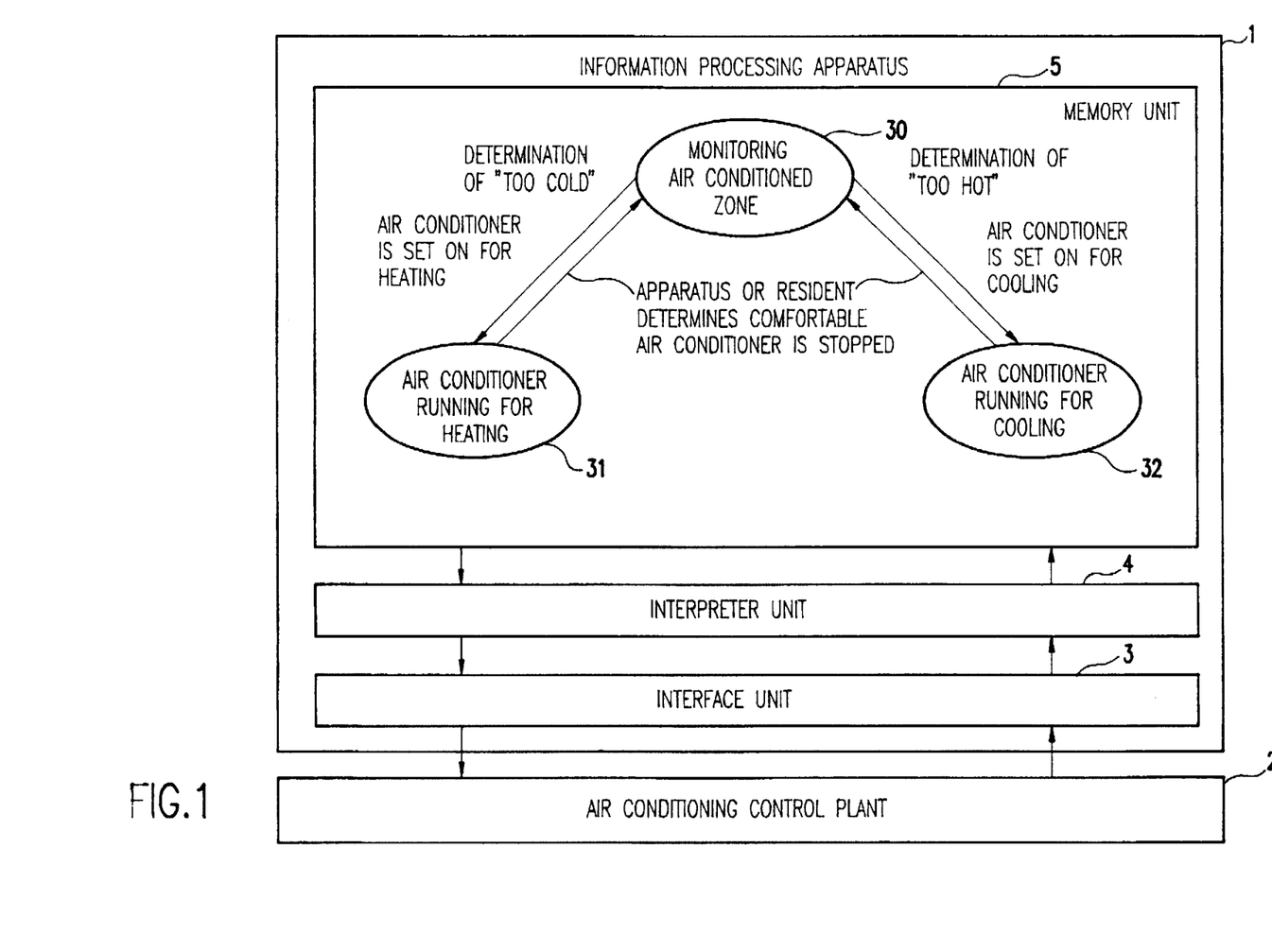

Referring first to FIG. 1, an information processing apparatus 1 using a state transition model includes an interface interpreter unit 4, and a storage unit 5. The interface unit 3 is coupled to an air conditioning control plant 2 for receiving temperature data supplied from the air conditioning control plant 2 and outputting a control signal to the air conditioning control plant 2. The interpreter unit 4 collates temperature data supplied from the interface unit 3 with a state transition mode stored in the storage unit 5 to determine a current state of the air conditioning control plant 2 on the state transition model. Then, a control signal is generated in the interpreter unit 4 corresponding to the current state and transferred to the interface unit 3.

The storage unit 5 contains three states 30, 31, 32 in the state transition model. Specifically, state 30 shows "MONITORING AIR CONDITIONED ZONE" which represents that an air conditioning apparatus is not operating for some reason, e.g., because the temperature in an air conditioned zone is appropriate. State 31 shows "AIR CONDITIONER RUNNING FOR HEATING" which represents that the air conditioning apparatus is in a heating operation since the temperature in the air conditioned zone is determined to be too low for people to stay therein. State 32 shows "AIR CONDITIONER RUNNING FOR COOLING" which represents that the air conditioning apparatus is in a cooling operation since the temperature in the air conditioned zone is determined to be too high for people to stay therein.

Figure 2:
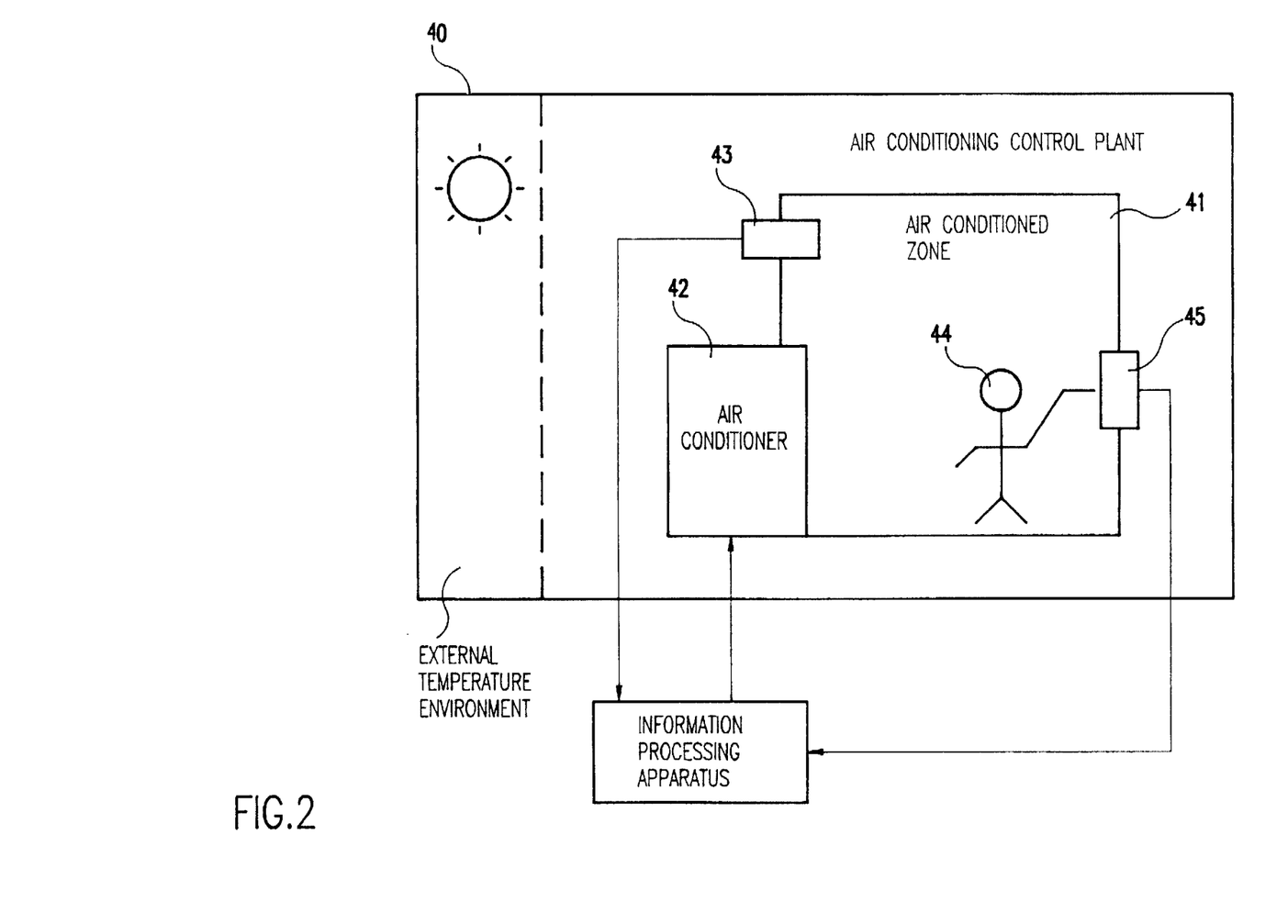
FIG. 2 is a diagram showing the configuration of an air conditioning control plant which constitutes a system to be controlled in FIG. 1.

Referring next to FIG. 2, the air conditioning control plant 2 includes, as its basic constituents, external temperature environment 40; an air conditioned zone 41, which is actually the object of the air conditioning operation. An air conditioned zone 41, for example, will also include, as variables, the number of the residents 44, amounts of action and closing of the residents 44, internal illumination, and the state of the external temperature environment 40, for example, external air temperature, amount of radiant energy from sunshine, and so on, each of which has an effect of the operation of the air conditioner associated with the air conditioned zone.

The air conditioner 42 has two operation modes: a heating mode and a cooling mode which are switched by instructions from the information processing apparatus 1. The information processing apparatus 1 determines a current state of the air conditioned zone 41 based on an input from the temperature sensor 43 and controls the air conditioner 42 such that a comfortable state is always provided in the air conditioned zone.

The residents 44 in the air conditioned zone 41 are assumed to be sensitive and active subjects who determine whether or not the environment in the air conditioned zone 41 is comfortable based on personal preference independent of the determination made by the information processing apparatus 1, and instruct the information processing apparatus 1 for switching the cooling and heating operations through the temperature setting panel 45. In the state transition model described in the memory unit 5 of FIG. 1, arrows interconnecting the respective states are referred to as "arc" which is used to set transition conditions or control for transition to a next state. No matter where on the state transition model the current state of the air conditioned zone 41 exists, if transition conditions of an arc are satisfied, the information processing apparatus 1 transfers the air conditioned zone 41 from the current state to a state which is the destination pointed to by the arc, and corresponding control is simultaneously executed by the information processing apparatus 1. If transition conditions are not satisfied, a transition does not occur and the current state of the air conditioned zone 41 is maintained until a transition is required.

Next, the operation of the information processing apparatus 1 will be explained with reference to FIG. 1. The temperature sensor 43 in the air conditioning control plant 2 supplies current temperature data to the interface unit 3 of the information processing unit 1. The interface unit 3 decodes the supplied temperature data and delivers it to the interpreter unit 4. The interpreter unit 4 collates a state derived from the supplied temperature data with the state transition model stored in the memory unit 5 to determine a current state of the air conditioning control plant 2 on the state transition model. When a current state on the state transition model remains, for example, at "MONITORING AIR CONDITIONED ZONE" 30, the interpreter unit 4 maintains the current state at "MONITORING AIR CONDITIONED ZONE" 30 and does not allow the current state to transit to any other state unless the transition conditions (e.g., it is too hot or too cold) are satisfied, even if temperature data is supplied thereto from the temperature sensor 43, whereby no control is executed. However, once the interpreter unit 4 determines that supplied temperature data meets the condition of being too hot, for example, the interpreter unit 4 delivers a control output instructing a cooling operation to the air conditioning control plant 2 through the interface unit 3.

As a result, the air conditioner 42 starts the cooling operation, which leads to the state directed to "AIR CONDITIONER RUNNING FOR COOLING" 32 on the state transition model. When the temperature in the air conditioned zone 41 is cooled by the cooling operation of the air conditioner 42 to cause the interpreter unit 4 to determine from temperature data supplied thereto that the temperature in the air conditioned zone 41 is appropriate, a control output instructing the air conditioning control plant 2 to stop the cooling operation is delivered to the air conditioner 42 to stop the cooling operation, thus directing the current state of the state transition model to "MONITORING AIR CONDITIONED ZONE" 30. In this manner, the temperature control performed by the air conditioning control plant 2 is completed. The control as described above may be performed by the residents 44 who manipulate the temperature setting panel 45 based on their senses to force generation of a state transition.

The state transition model shown in FIG. 1 is simplified for facilitating explanation and understanding of the invention. When a state transition model is to be built for a large scale system, very abstract states are first defined. Each of the states is divided into a plurality of sub-states, each of which represents detailed definitions of the state in order to implement functions corresponding to the state. Each of these sub-states may be further divided into a plurality of lower grade states for representing the sub-state in greater detail, thus sub-dividing the states in a hierarchy of multiple layers until each state reaches the most simple and clear aspect as possible. In this manner, conventional state transition models have a hierarchical structure, wherein a state transition model for a system of interest, or a system to be controlled, is sub-divided into small sub-systems having internal structures which are independent of each other and which are described as basic constituent units. The sub-systems are recomposed to rebuild the original system to thereby enable a development of a structured system and description thereof by a structured specification.

It is therefore possible, from the viewpoint of the development of a large scale system, to realize parallel development of sub-divided portions of the whole system, and the period required for the development reduced. Further, the sub-systems may be utilized in the development of other systems. However, since the division of a state transition model into sub-systems according to a conventional hierarchical structure is a building technique for a system designer to manage a system developing project, it fails to clearly analyze the specifications required for a system. That is, the mere sud-division of the system from very abstract states does not inherently force a rational analysis of system functions and system responses to real world events and behaviors. Accordingly, the following problems often result:

(1) In a process of defining the specifications of a system of interest and an information processing system, a sufficient analysis may not have been made of specifications required by a user. Therefore, system development may possibly advanced in a direction which deviates from user's requirements. A state transition model is often so complicated that, although individual sub-systems operate separately, the whole system is susceptible to mismatching among the sub-systems particularly when corrections are made in the system design. In the worst case, the whole system must be redesigned.

(2) From a viewpoint of system designing, simple division of a system into sub-systems in accordance with a hierarchical structure may possibly separate portions which should originally be included in a single sub-system, failing to result in a rational system which should essentially be created.

(3) With an irrational system, it is possible that serious malfunction or incompatibility (e.g. a "bug"), which should have been discovered at an initial designing stage, may be overlooked until a final development state. Such an occurrence can have an enormous effect on the entire development project. Further, even if a bug is found, it is difficult, in the case of such a system designed irrespective of relational determinations, to locate the cause of the bug and correct it in a short time period and to reliably evaluate a range which will be adversely affected by modifications involved in the correction.

(4) For system maintenance, when the user requires an improvement in the system, it is difficult to specify a range of the system which will require corresponding changes in a short time period to complete the improved system. It is also difficult to previously predict, at a stage of analyzing the required improvement, to what extent the design change will affect the existing system. In the worst case, the whole system would have to be redesigned.

(5) In actual applications, such as in an information processing apparatus, a state transition model is so complicated and difficult to describe, incomplete capability of a base model will impede system development since the specification definition is necessarily incomplete and unclear, particularly in a large scale system.

SUMMARY OF THE INVENTION

In view of the problems stated above, it is an object of the present invention to provide an information processing apparatus using a state transition model which is capable of making rational associations between possible autonomous behaviors of a controlled system and actions of the controlled system which can be operated to achieve desired response of the controlled system.

To achieve the above object, the present invention provides an information processing apparatus based on a state machine in which the states are, at least in part, organized in accordance with triad-based state transition model. The organization of states of the state machine which will be hereinafter referred to as a triad-based state transition model refers to a state transition model having three groups or classes of states. According to the present invention, the triad-based state transition model is made up of a first group of states for defining natural behavior of a system to be controlled irrespective of forced actions (e.g. autonomous behaviors); a second group of states for defining forced actions for directing the behavior of the system to be controlled to a target value, parameter or condition; and a third group of states for defining target conditions to which the system to be controlled may proceed from the first group of states as a result of determining natural behavior of said system based on a first predetermined threshold value, and as a result of determining a change in the system behavior due to a forced action based on a second predetermined threshold value.

The present invention provides an information processing apparatus using a state transition model for processing information on a system to be controlled, comprising: an interpreter unit for interpreting a state transition model for processing information on the system to be controlled and for controlling the system to be controlled based on a current state of the system to be controlled represented on said state transition model, a memory unit for storing the state transition model and implementing a finite state transition machine including a first group of states for defining natural behavior of said system to be controlled irrespective of forced actions; a second group of states for defining forced actions for making the behavior of said system to be controlled proceed to a target; and a third group of states for defining target conditions to which the system to be controlled may proceed from the first group of states as a result of determining natural behavior of the system based on a first threshold value previously determined by said interpreter unit, and as a result of determining a change in the system behavior due to a forced action based on a second threshold value previously defined by said interpreter unit; and an interface unit for interfacing said information processing apparatus with the system to be controlled.

In the information processing apparatus as described above, the interpreter unit collates data from a system to be controlled with the triad-based state transition model to determine a current state of the system on the state transition model. For example, if the current state of the system belongs to the natural state group and the interpreter unit determines that any of previously defined transition conditions is satisfied, the system is directed to a state in the target state group. If a state in the target state group is defined for the state, to which the system has been directed, as a target to be next reached, the system is again directed to a state in the action state group to perform a control defined for that action state. Thus, the system is directed to the target state, and the control is completed. The state transition may be generated and controlled by externally made determinations by users or residents. The above and other objects, features and advantages of the present invention will become more apparent by the following detail description of the embodiment when read in conjunction with the accompanying drawings.

BRIEF DESCRIPTION OF THE DRAWINGS

The foregoing and other objects, aspects and advantages will be better understood from the following detailed description of a preferred embodiment of the invention with reference to the drawings, in FIG. 1 is a block diagram showing an information processing apparatus using a conventional state transition model for purpose of temperature control.

DETAILED DESCRIPTION OF A PREFERRED EMBODIMENT OF THE INVENTION

Figure 3:
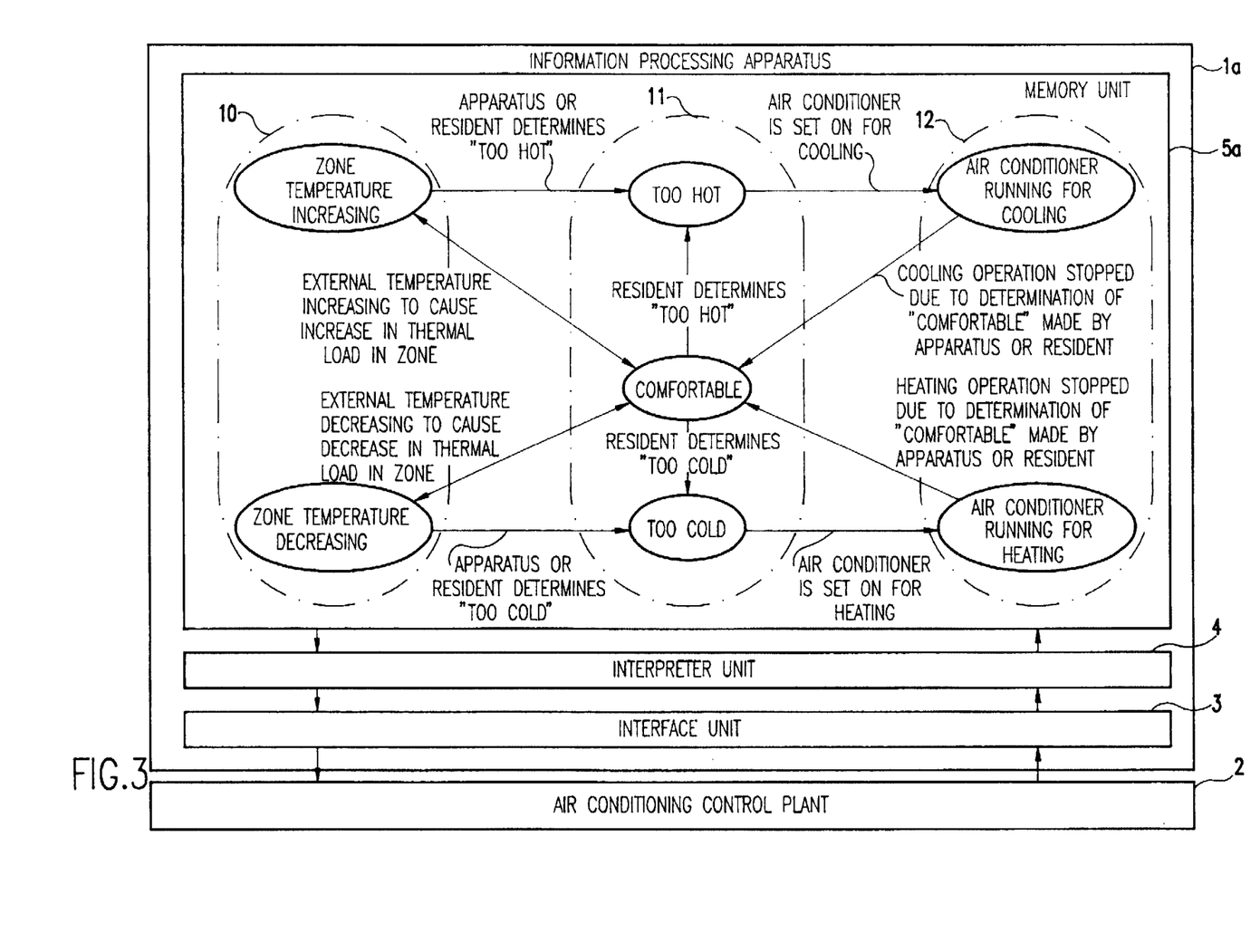
FIG. 3 is a block diagram showing an information processing apparatus using a triad-based state transition model for temperature control according to one embodiment of the present invention.

FIG. 3 is a block diagram illustrating an information processing apparatus using a triad-based state transition model, according to one embodiment of the present invention. In this embodiment, the information processing apparatus of the invention is applied to a temperature control by way of example. It should be noted however that this example is merely illustrative, and the present invention is applicable to a variety of other control purposes.

Referring to FIG. 3, an information processing apparatus 1a includes an air conditioning control plant 2 similar to that of FIGS. 1 and 2; an interface unit 3; an interpreter unit 4 which is supplied with temperature data inputted through the interface unit 3 and collates the temperature data with the triad-based state transition model implementing a finite state machine described and stored in a memory unit 5a to determine a current state of the air conditioning control plant 2 on the triad-based state transition model. If a target state, to which the air conditioning control plant 2 is to reach in the next phase, has been defined on the triad-based state transition model, this target state is determined on the triad-based state transition model, and a control output is generated for directing the air conditioning control plant 2 to the target state to be next reached.

The triad-based state transition model further includes a group 10 which is a natural state group for clearly recognizing behaviors of the air conditioning control plant 2. The natural state group 10 defines natural behaviors independent of actions taken by the information processing apparatus 1a in the air conditioning control plant 2. For example, a natural temperature increase in an air conditioned zone may occur due to, say, a change in external air temperature. The triad-based state transition model also includes a target state group 11 for clearly recognizing targets of the air conditioning control plant 2. Specifically, the target state group 11 defines a state of the air conditioning control plant determined by the information processing apparatus 1a based on predetermined threshold values, such as a threshold value for controlling the air conditioned zone to be maintained at approximately a target temperature, a state of the air conditioning control plant 2 sensitively determined by residents, and a target state to which the air conditioning control plant 2 is to reach (e.g. a quiescent or desired state).

The triad-based state transition model further includes an active state group 12 for clearly recognizing control actions of the air conditioning control plant 2. Specifically, the active state group 12 defines forced actions for driving the air conditioning control plant 2 to control the object to a target to be reached, for example, a control of a cooling mechanism which works against natural temperature increase in the air conditioned zone. The active state group in FIG. 3 includes two states labelled "AIR CONDITIONER RUNNING FOR COOLING" and "AIR CONDITIONER RUNNING FOR HEATING". The information processing apparatus 1a of the present embodiment is similar to the prior art example shown in FIG. 1 except for the memory unit 5a in which the triad-based state transition model is described and maintained for implementation of a state machine in accordance with the invention. The air conditioning control plant 2 is similar to that shown in the example of FIG. 2, and similar reference numerals will be used insofar as possible.

While the triad-based state transition model or state machine of the present embodiment is similar to the example of FIG. 1 in operations which result in transitions between states (that is, determination when a transition condition is satisfied and the actual transition in response thereto), the methodology by which the state machine is constructed is very different from that of the example of FIG. 1.

Specifically, in the triad-based state transition model, the target state group is first defined. This is because the target state group 11 is a sole state group which simultaneously represents a state group reached by the air conditioning control plant 2 as a result of spontaneous or autonomous change appearing in response to the natural features and behaviors. The target state group also represents states or targets to which the information processing apparatus 1a drives the air conditioning control plant 2 at the next stage, as well as serving as a sole state group for mutually interfacing the information processing apparatus 1a and the air conditioning control plant 2. For example, "TOO HOT", "COMFORTABLE" and "TOO COLD" states are defined in the model of FIG. 3.

Next, a plurality of states belonging to the target state group 11 are analyzed to determine to which states each of the states within the target state group is directly connected, and each of the directly related states is interconnected by an arc to which transition conditions are set. A majority of transition conditions are actions taken by residents 44 staying in the air conditioned zone 41. In the example of FIG. 3, two transition conditions, i.e., "RESIDENT DETERMINES TOO HOT" and "RESIDENT DETERMINES TOO COLD" are defined, as shown. The state machine is implemented in accordance with this phase of the design simply by associating an address or name of a control function in memory 5 with these particular transitions conditions.

Next, pairs of two states coupled by an arc and belonging to the target state group 11 are considered and a natural behavior of the air conditioning control plant 2 is recognized with respect to a state transition between two states in the pairs. This behavior is defined as a constituent element of the natural state group 10. In the example of FIG. 3, "ZONE TEMPERATURE INCREASING" and "ZONE TEMPERATURE DECREASING" are defined. The state machine is implemented in accordance with this portion of the design by definition of addresses or names corresponding to the individual states of the natural state group 10.

Next, state transitions between states belonging to the natural state group 10 and the target state group 11 are analyzed, each two states in transition relationship are interconnected by an arc, and transition conditions are set along with the arc. The transition conditions include natural behaviors of the air conditioned zone 41, natural changes in the external air temperature environment 40, and actions made by the residents 44 and the information processing apparatus 1a. Transition conditions defined as natural behavior of the air conditioned zone 41 may be, for example, an increased or decreased thermal load in the room due to an increased or decreased number of residents 44 or level of activity, illumination or the like. Transition conditions defined as natural changes in the external air temperature environment 40 may include such factors as external air temperature increase and external air temperature decrease and heat gain from sunlight. This portion of the design is implemented in a state machine simply by associating the name or address of the associated natural state with the transition condition detected and a target (or natural) state.

Further, transition conditions defined as actions of the residents 44 may include "RESIDENT DETERMINES TOO HOT" and "RESIDENT DETERMINES TOO COLD", while transition conditions defined as actions of the information processing apparatus 1a may include "APPARATUS OR RESIDENT DETERMINES TOO HOT" and "APPARATUS OR RESIDENT DETERMINES TOO COLD". This portion of the design is implemented in the state machine by associating a name or address of a target state in memory 5 with a natural state and the determination by the apparatus or resident of the transition condition is satisfied.

Similarly, two pairs of states coupled by an arc in the target state group 11 are selected and analyzed. A forced action acting as control is recognized with respect to a state transition between the two states of in each pair and this action is defined as a constituent element in the action state group 12. In the example of FIG. 3, "AIR CONDITIONER RUNNING FOR COOLING" and "AIR CONDITIONER RUNNING FOR HEATING" are defined as such actions. This is implemented in a state machine in the same manner as states of the natural state group are defined; by the establishment of a name or address which will invoke the action represented by the state.

Next, state transitions between each state belonging to the action state group 12 and each state belonging to the target state group 11 are analyzed in pairs which are interconnected by an arc, and a state transition or control is set along with the arc. These state transitions or controls may also include actions made by the residents 44 and the information processing apparatus 1a. An exemplary action made by a human or one of the residents 44 so defined as a transition condition would be a determination that the temperature in the air conditioned zone is appropriate. Also, actions made by the information processing apparatus 1a defined as transition conditions include controls such as "AIR CONDITIONER IS SET ON FOR COOLING", "AIR CONDITIONER IS SET ON FOR HEATING", "COOLING OPERATION STOPPED DUE TO DETERMINATION OF COMFORTABLE MADE BY APPARATUS OR RESIDENT" and "HEATING OPERATION STOPPED DUE TO DETERMINATION OF COMFORTABLE MADE BY APPARATUS OR RESIDENT", as well as determination of the apparatus 1a that the temperature in the air conditioned zone is appropriate. This portion of the design is implemented in a state machine by association of each such transition condition and a target state with the name, address or other identification (e.g. a command) corresponding to the associated action state. Thus, the building of the model and implementation in a state machine has been completed which clearly recognizes the role of the system of interest, which is to be measured, controlled and monitored, as well as the role of the residents and devices involved in the system of interest. Next, the operation of the information processing apparatus 1a using the triad-based state transition model as described above will be explained. The operation of the interface unit 3 is identical to that of the prior art example shown in FIG. 1. The interpreter unit 4 collates input data representing a current state from the temperature sensor with the triad-based state transition model stored in the memory unit 5a to determine the current state of the air conditioning control plant 2 on the triad-based state transition model.

When the current state of the air conditioning control plant 2 on the triad-based state transition model indicates "COMFORTABLE" (e.g. the quiescent state) in the target state group 11, even if temperature data is supplied from the temperature sensor 43 to the interface unit 3, the interpreter unit 4 does not allow transition of the current state to another state nor execute any control unless the interpreter unit 4 determines that the temperature data falls under any of transition conditions such as an increase in the external air temperature or the like (or resident determined transition conditions between states of the target state group). When the interpreter unit 4 determines that the temperature in the air conditioned zone 41 has increased due to an increase in the external air temperature or the like, the interpreter unit 4 directs the current state to "ZONE TEMPERATURE INCREASING" in the natural state group 10. In the event that the temperature keeps increasing and exceeds a threshold value determined in the transition conditions to another state in the natural or target state groups, the interpreter unit 4, for example, determines "TOO HOT" and directs the current state to "TOO HOT" in the target state group 11 as well as issues a control output instructing a cooling operation to the air conditioning control plant 2 through the interface unit 3. As a result, the air conditioner 42 starts the cooling operation, which causes the state on the triad-based state transition model to move to "AIR CONDITIONER RUNNING FOR COOLING" in the action state group 12.

When the cooling operation causes the temperature in the air conditioned zone 41 to decrease so that the interpreter unit 4 determines "COMFORTABLE" from temperature data supplied thereto, the interpreter unit 4 issues a control instruction to the air conditioning control plant 2 to stop the cooling operation of the air conditioner 42 and directs the current state to "COMFORTABLE" in the target state group 11. Thus, the temperature control is completed for the air conditioning control plant 2.

Figure 4:
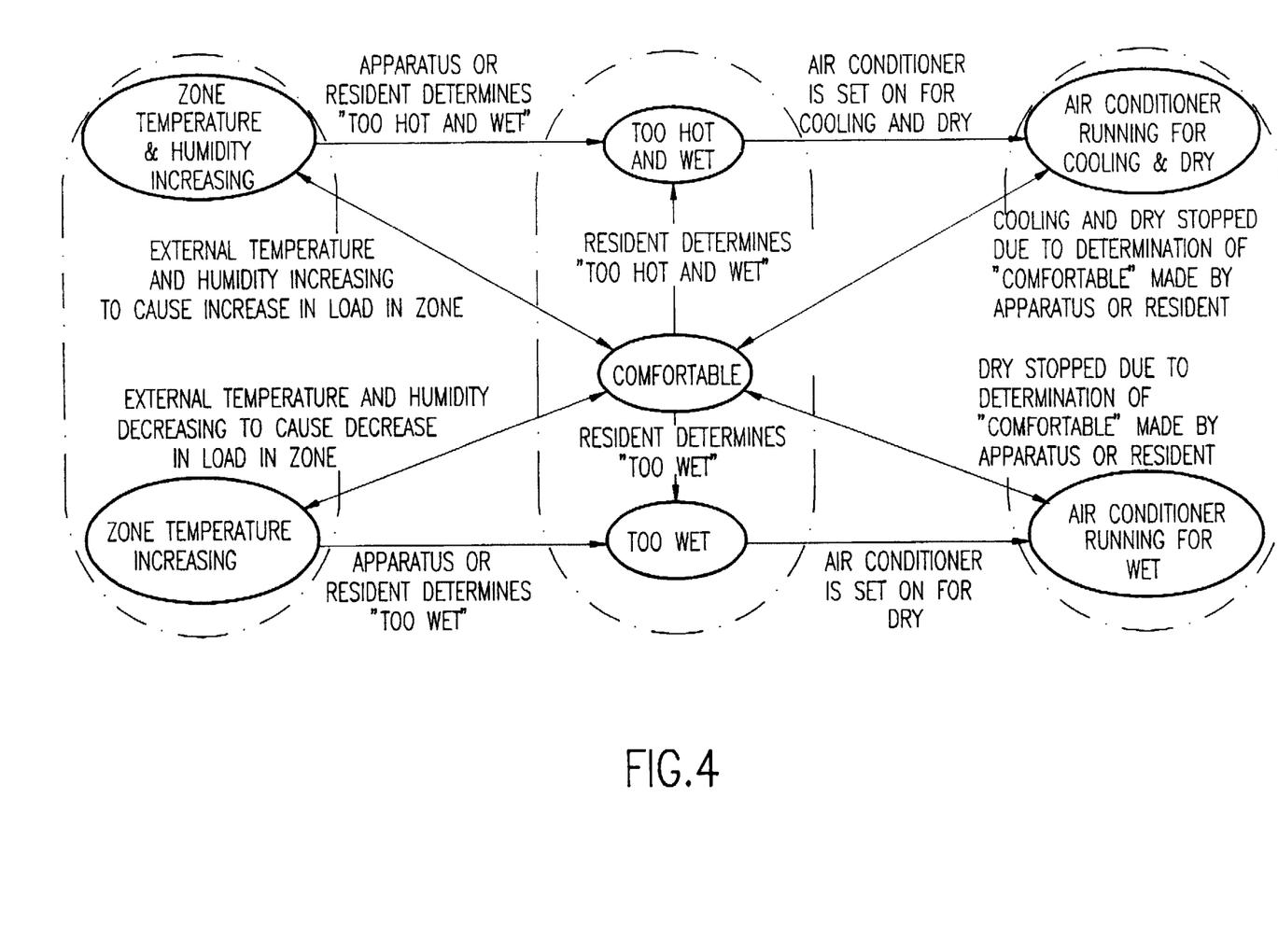
FIG. 4 is a block diagram showing an information processing apparatus using a triad-based state transition model for temperature and humidity control according to another embodiment of the present invention.

The temperature control of the preferred embodiment allows the residents 44 to determine the current state of the air conditioned zone 41 from their own sense and preference and to manipulate the temperature setting panel 45, thus forcibly producing a state transition for control, in a manner similar to the example shown in FIG. 1. Although the embodiment shown in FIG. 3 is adapted to control the air conditioned zone 41 only relative to the temperature, if a humidity sensor is also provided in the air conditioned zone 41 in addition to the temperature sensor, and also if the air conditioner 42 has dry and humidification operation modes, the triad-based state transition model can be easily defined so as to allow a composite control for temperature and humidity to be performed on the air conditioned zone 41. FIG. 4 shows another embodiment of the present invention wherein a triad-based state transition model is built and implemented in a state machine for an information processing apparatus for the purpose of temperature and humidity control. A temperature and humidity composite control can be likewise carried out by the information processing apparatus having a triad-based state transition model as shown in FIG. 4. Of course, it should be understood that the implementations of FIGS. 3 and 4 can be utilized together by adding target states which allow entry into or exit from an action states and entry into another action state based on individual or plural transition conditions, such as if temperature were to be brought into a correct range before humidity is corrected.

In this manner, it will be appreciated that the information processing apparatus using a triad-based state transition model may be readily applicable to dust control, smell control and other environment controls. As described above, according to the present invention, analyses on a system of interest from viewpoints of behaviors, targets and control of the system of interest permit the role of the system as well as the roles of users and various devices to be easily recognized and defined to facilitate the description of a clear and rational state transition model, thus making it possible to easily and rapidly design and implement a rational system meeting user's requirements or to change the system design at a design stage of an information processing apparatus.

Since the present invention allows a state transition model of a large scale system to be more easily described and precisely than the prior art and to be implemented in a state machines in an orderly and simple manner, the invention can be used in a wide variety of applications. For example, such applications may include communication protocol controllers, database sorting apparatus, logical operation processors, sequence controllers, process controller/ monitors, control/monitor simulators, controller/monitor development supporting apparatus, software development supporting apparatus, user interface devices, and so on. It will be understood that the present invention may be applicable to any system which is controlled by use of a state transition model, irrespective of its scale and complexity.

While the present invention has been described in conjunction with the preferred embodiments thereof, it should be understood that many modifications and variations can be created without departing from the spirit and true scope of the present invention. It is therefore intended that all such modifications and variations fall under the scope of the appended claims.

Having thus described my invention, what I claim as new and desire to secure by letters patent is as follows:

1. An information processing apparatus using a finite state transition machine for processing information on a system to be controlled, comprising:

(a) an interpreter unit having an interpreter for interpreting and executing a state transition model as a program for processing information on the system to be controlled and for controlling the system to be controlled based on a current state of the system to be controlled represented in said finite state transition machine and data inputs to cause a transition from said current state to new state in accordance with transition values associated with said current state;

(b) a memory unit for storing the finite state transition machine as a program and all states and transition conditions associated therewith, said finite state transition machine being interpreted by an interpreter and used as a program for controlling said system to be controlled, said finite state transition machine including:

a group of natural states defining states of said system to be controlled that result from a natural behavior of said system which natural behavior is independent of inputs to force a change of said system;

a group of forcing states defining said inputs to force a change of said system which inputs direct a behavior of said system to be controlled to proceed to a target state; and a group of target states defining target states to which said system to be controlled proceeds as a result of the system behavior due to said inputs to force a change of state of said system achieving one predetermined transition value, the three groups of states representing all possible states of said system to be controlled;

said state transition machine transitioning from said target states to said natural states in response to a set of transition values associated in said memory unit with said target states and representing a natural behavior of said controlled system defined by one of said natural states;

said state transition machine transitioning from said natural states to said target states in response to a set of transition values associated in said memory unit with said natural states and representing a natural behavior of said controlled system defined by one of said natural states;

said state transition machine transitioning from said natural states to said forcing states in response to a set of transition values representing threshold values associated in said memory unit with said natural states;

said state transition machine transitioning from said forcing states to said target state in response to a set of transition values representing threshold values associated in said memory unit with said forcing states;

said finite state transition machine being interpreted as a program and executed by said interpreter unit; and (c) an interface unit for interfacing said interpreter unit with the system to be controlled such that control information is communicated between said interpreter unit and said system to be controlled.

2. An information processing apparatus according to claim 1, wherein said system to be controlled is an air conditioning control plant.

* * * * *